(12) United States Patent
Moreno

(10) Patent No.: US 8,573,661 B1
(45) Date of Patent: Nov. 5, 2013

(54) VEHICLE SIDE PROTECTOR

(76) Inventor: Robert J. Moreno, Denver, CO (US)

( * ) Notice: Subject to any disclaimer, the term of this patent is extended or adjusted under 35 U.S.C. 154(b) by 337 days.

(21) Appl. No.: 13/014,509

(22) Filed: Jan. 26, 2011

(51) Int. Cl.
*B60R 19/42* (2006.01)

(52) U.S. Cl.
USPC .......................................... 293/128; 296/207

(58) Field of Classification Search
USPC .......... 296/128, 136, 136.07, 203.01, 187.01, 296/180.4, 207; 293/142, 128, 126, 155; 280/770
See application file for complete search history.

(56) References Cited

U.S. PATENT DOCUMENTS

| | | | | |
|---|---|---|---|---|
| 4,127,294 A | * | 11/1978 | Cooper | 293/120 |
| 4,437,697 A | * | 3/1984 | Hinojos | 293/118 |
| 4,561,685 A | * | 12/1985 | Fischer | 293/128 |
| 4,596,348 A | * | 6/1986 | Stamp | 224/572 |
| 4,674,783 A | | 6/1987 | Hogan, III | |
| 4,707,009 A | | 11/1987 | Barnett | |
| 4,828,303 A | * | 5/1989 | Soria | 293/128 |
| 5,149,166 A | | 9/1992 | Wille et al. | |
| 5,184,857 A | * | 2/1993 | Hawkins | 293/128 |
| D335,271 S | | 5/1993 | Davis | |
| 6,186,564 B1 | | 2/2001 | Ashcroft | |
| 6,406,080 B1 | | 6/2002 | Davis | |
| 6,971,693 B1 | * | 12/2005 | Richardson | 293/128 |
| 7,229,108 B2 | | 6/2007 | Hochrein | |
| 2005/0099026 A1 | | 5/2005 | Velazquez | |
| 2007/0108780 A1 | | 5/2007 | Udolph | |
| 2007/0158963 A1 | * | 7/2007 | Debs | 293/128 |

\* cited by examiner

*Primary Examiner* — Dennis Pedder
*Assistant Examiner* — Pinel Romain

(57) ABSTRACT

A vehicle side protector provides a compact easily transported and deployed padded rod couplable to a vehicle providing a physical barrier to prevent damage to the side of the vehicle. The protector includes a collapsible rod assembly having a plurality of sections. A plurality of pads is coupled to the rod assembly. A front attachment line coupled to and extends from the rod assembly and a back attachment line is coupled to and extends from the rod assembly. A front attachment hook is coupled to the front attachment line and a back attachment hook coupled to the back attachment line.

14 Claims, 4 Drawing Sheets

FIG. 4
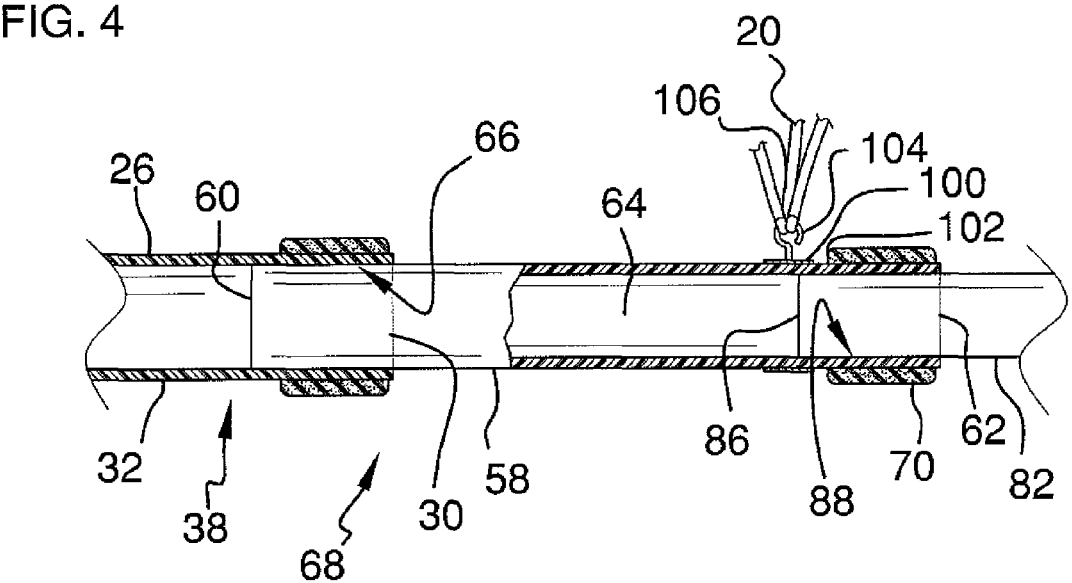
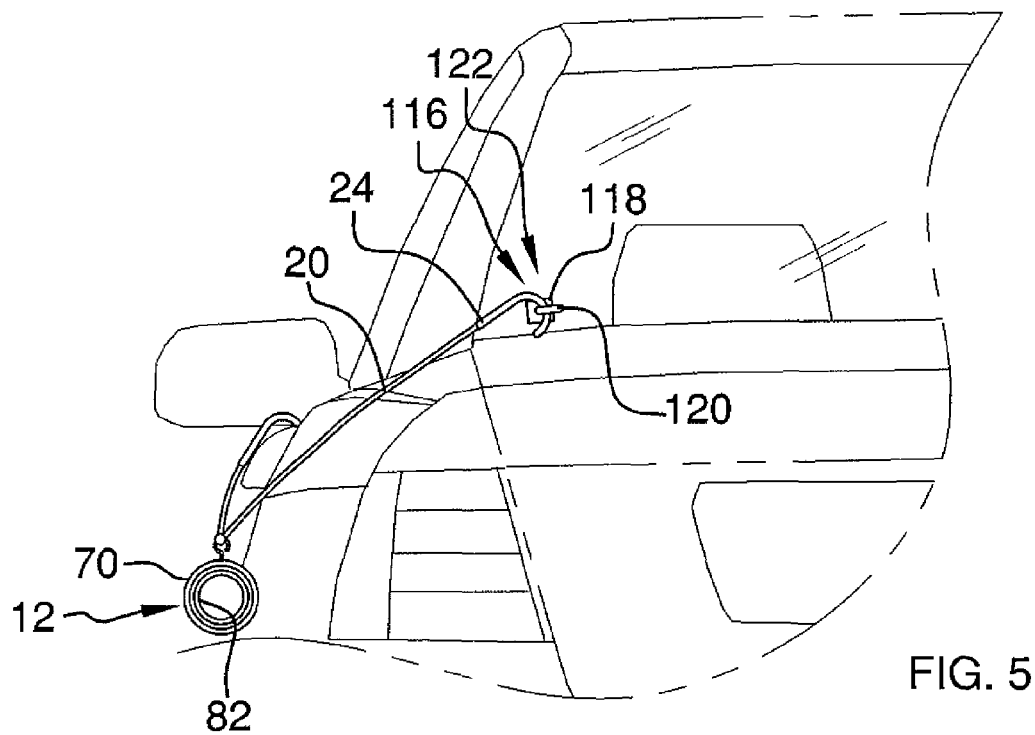
FIG. 5

VEHICLE SIDE PROTECTOR

BACKGROUND OF THE DISCLOSURE

Field of the Disclosure

The disclosure relates to vehicle dent prevention devices and more particularly pertains to a new vehicle dent prevention device for providing a compact easily transported and deployed padded rod couplable to the vehicle to extend along the side of the vehicle providing a physical barrier to prevent damage to the side of the vehicle.

SUMMARY OF THE DISCLOSURE

An embodiment of the disclosure meets the needs presented above by generally comprising a collapsible rod assembly having a plurality of sections. A plurality of pads is coupled to the rod assembly. A front attachment line coupled to and extends from the rod assembly and a back attachment line is coupled to and extends from the rod assembly. A front attachment hook is coupled to the front attachment line and a back attachment hook coupled to the back attachment line.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a cross-sectional view of an embodiment of the disclosure taken along line 4-4 of FIG. 3.

FIG. 5 is an end view of an embodiment of the disclosure.

DESCRIPTION OF THE PREFERRED EMBODIMENT

Figure 1:
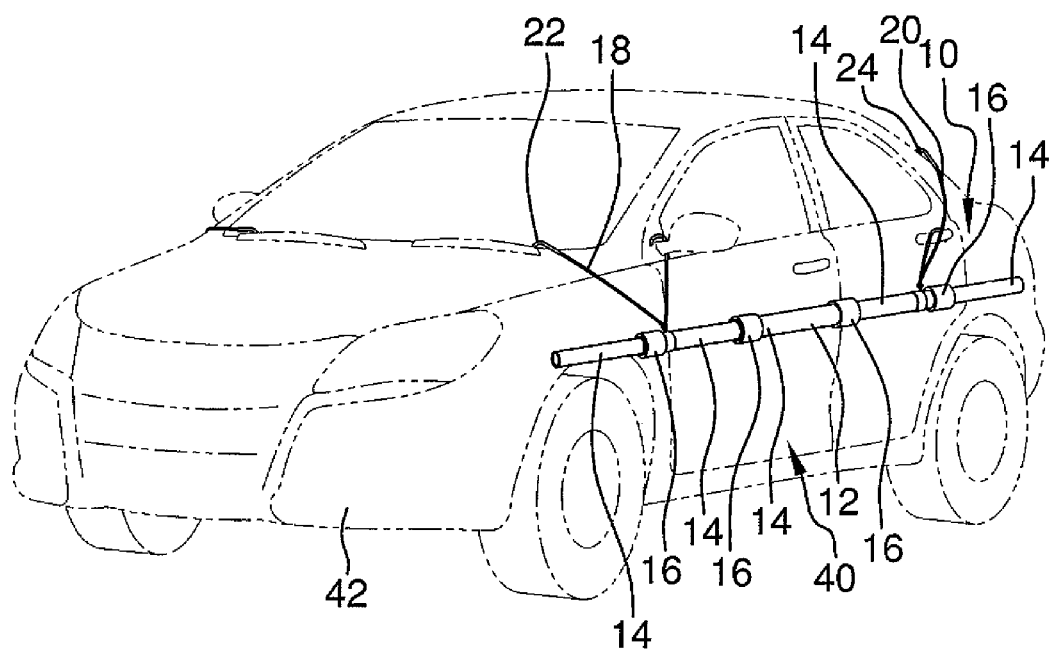
FIG. 1 is a top front side perspective view of a vehicle side protector according to an embodiment of the disclosure.
Figure 2:
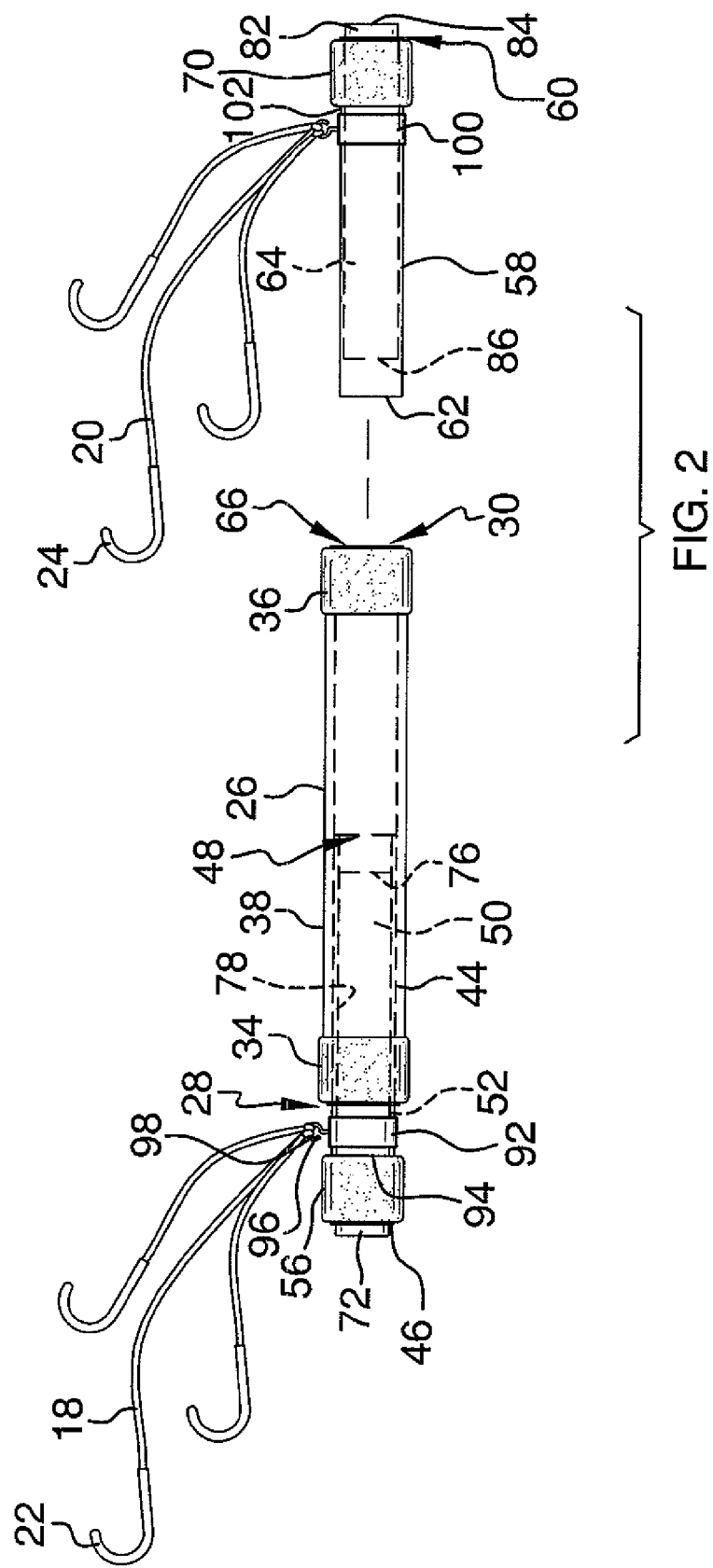
FIG. 2 is a front view of an embodiment of the disclosure in a partially collapsed position.
Figure 3:
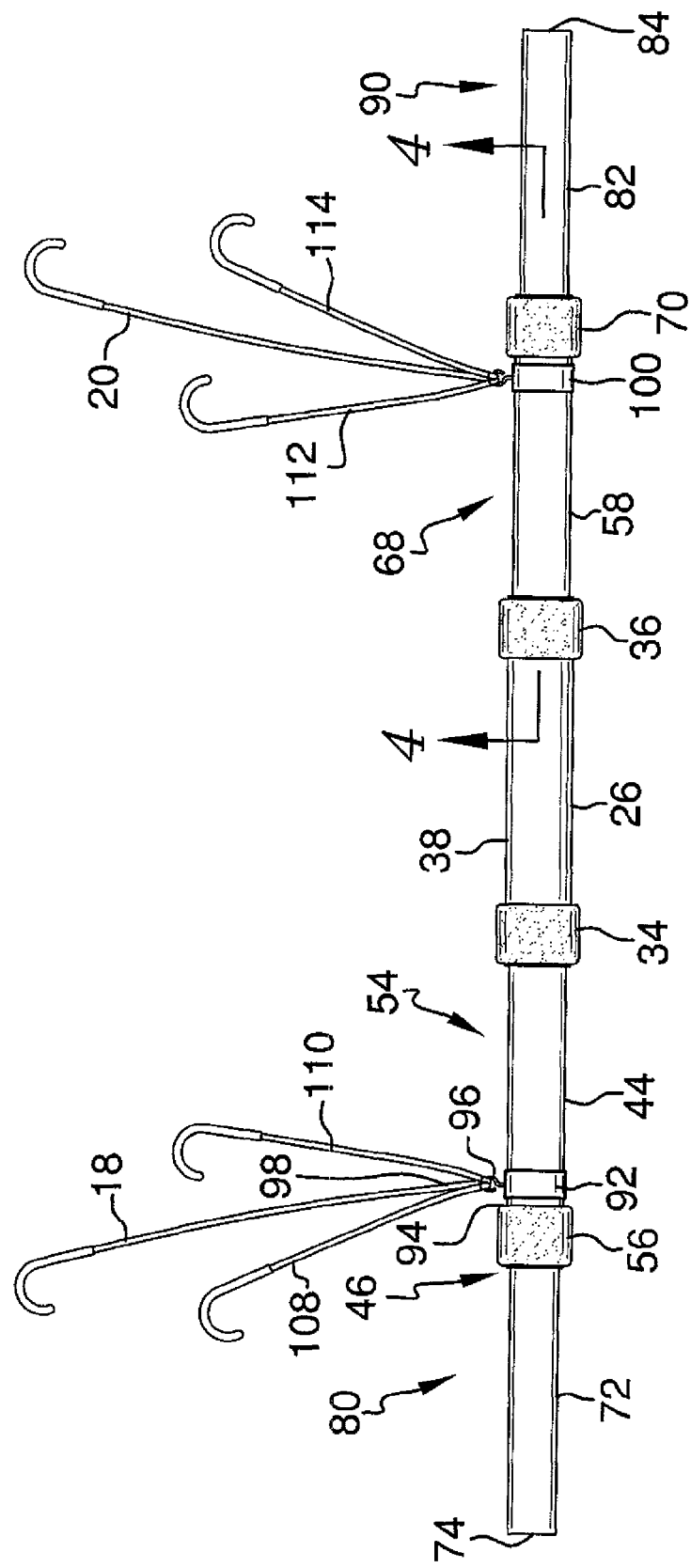
FIG. 3 is a front view of an embodiment of the disclosure in an expanded position.

With reference now to the drawings, and in particular to FIGS. 1 through 5 thereof, a new vehicle dent prevention device embodying the principles and concepts of an embodiment of the disclosure and generally designated by the reference numeral 10 will be described.

As best illustrated in FIGS. 1 through 5, the vehicle side protector 10 generally comprises a collapsible rod assembly 12 having a plurality of sections 14. A plurality of pads 16 coupled to the rod assembly 12. A front attachment line 18 and a back attachment line are each coupled to and extend from the rod assembly 12. A front attachment hook 22 is coupled to the front attachment line 18, and a back attachment hook 24 coupled to the back attachment line 20.

The plurality of sections 14 includes a central section 26 having an open first end 28, an open second end 30, and a perimeter wall 32 extending continuously from the open first end 28 to the open second end 30. The plurality of pads 16 includes a front central pad 34 which is coupled to the perimeter wall 32 of the central section 26 proximate the open first end 28 of the central section 26. Another of the plurality of pads 16 includes a back central pad 36 that is coupled to the perimeter wall 32 of the central section 26 proximate the open second end 30 of the central section 26. The front central pad 34 and back central pad 36 are spaced apart and extend from an outer surface 38 of the central section 26 to contact an outer surface 40 of a vehicle 42 and support the central section 26 in spaced relationship to the outer surface 40 of the vehicle 42.

A front medial section 44 of the rod assembly 12 is slidably inserted into the open first end 28 of the central section 26. The front medial section 44 has an open first end 46, a second end 48, and a hollow interior 50 extending from the open first end 46 towards the second end 48. The second end 48 of the front medial section 44 is sized to engage an interior surface 52 of the central section 26 adjacent to the open first end 28 of the central section 26. Thus, the front medial section 44 may be frictionally held in an extended position 54 from the open first end 28 of the central section 26. One pad of the plurality of pads 16 is coupled to and extends around the front medial section 44 and defines a front pad 56. The front pad 56 is positioned adjacent to the open first end 46 of the front medial section 44 so that the front pad 56 is in spaced relationship to the front central pad 34 when the front medial section 44 is in the extended position 54.

Similarly, a back medial section 58 is slidably inserted into the open second end 30 of the central section 26. The back medial section 58 has an open first end 60, a second end 62, and a hollow interior 64 extending from the open first end 60 towards the second end 62. The second end 62 of the back medial section 58 is sized to engage an interior surface 66 of the central section 26 adjacent to the open second end 30 of the central section 26. As such, the back medial section 58 may be frictionally held in an extended position 68 from the open second end 30 of the central section 26. The plurality of pads 16 further includes a back pad 70 that is coupled to and extends around the back medial section 58. The back pad 70 is positioned adjacent to the open first end 60 of the back medial section 58 so that the back pad 70 is in spaced relationship to the back central pad 36 when the back medial section 58 is in the extended position 68.

A front end section 72 may be slidably inserted into the open first end 46 of the front medial section 44. The front end section 72 has a first end 74 and a second end 76 and may be hollow extending between the first end 74 and the second end 76. The second end 76 of the front end section 72 is sized to engage an interior surface 78 of the front medial section 44 adjacent to the open first end 46 of the front medial section 44. Thus, the front end section 72 is frictionally held in an extended position 80 from the open first end 46 of the front medial section 44.

A back end section 82 may be slidably inserted into the open first end 60 of the back medial section 58. The back end section 82 has a first end 84 and a second end 86 and may be hollow extending between the first end 84 and the second end 86. The second end 86 of the back end section 82 is sized to engage an interior surface 88 of the back medial section 82 adjacent to the open first end 60 of the back medial section 58.

Thus, the back end section 82 may be frictionally held in an extended position 90 from the open first end 60 of the back medial section 58.

A front collar 92 is coupled to and extends around the front medial section 44. The front collar 92 is positioned adjacent to a proximal end 94 of the front pad 56 relative to the central section 26. A front loop 96 extends from the front collar 92. The front attachment line 18 has a proximal end 98 relative to the front medial section 44 that is coupled to the front loop 96. Similarly, a back collar 100 is coupled to and extends around the back medial section 58. The back collar 100 is positioned adjacent to a proximal end 102 of the back pad 70 relative to the central section 26. A back loop 104 extends from the back collar 100. A proximal end 106 of the back attachment line 20 relative to the back medial section 58 is coupled to the back loop 104.

A secondary front attachment line 108, tertiary front attachment line 110, secondary back attachment line 112, and tertiary back attachment line 114 may also be coupled to and extend from the rod assembly 12 to provide varying lengths and options for positioning the rod assembly 12 in an optimal position relative to the side 40 of the vehicle 42. Attachment hooks may be provided to permit direct attachment or looping of the lines 108,110,112,114 around portions of the vehicle 42 such as windshield wipers, rearview mirrors or the like. An attachment member 116 having a base portion 118 may be provided for attachment to the vehicle 42. The attachment member 116 has a curved portion 120 extending from the base portion 118 so that either of the attachment hooks 22,24 is couplable to the attachment member 116. Thus, an attachment point 122 may be provided at any desired location on the vehicle 42 as desired. Lines 18,20,108,110,112,114 may all be removable or adjustable for length to provide greater flexibility in attaching the rod assembly 12 to the vehicle 42.

In use, the rod assembly 12 is generally stored in a collapsed position. The rod assembly 12 is extended and the attachment lines 18,20 are used to hold the rod assembly 12 in place with the pads 16 contacting the side 40 of the vehicle 42. Additional pads and sections may be utilized in similar fashion to provide extension and coverage over a longer distance for larger vehicles. The rod assembly 12 is positioned to receive and absorb contact with objects that might damage the side 40 of the vehicle 42. After use, the rod assembly 12 may be collapsed and stored until needed again.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A vehicle side protector assembly for positioning to extend along a side of a vehicle, said assembly comprising:
   a collapsible rod assembly having a plurality of sections;
   a plurality of pads coupled to said rod assembly;
   a front attachment line coupled to and extending from said rod assembly;
   a back attachment line coupled to and extending from said rod assembly;
   a front attachment hook coupled to said front attachment line;
   a back attachment hook coupled to said back attachment line;
   said plurality of sections including a central section having an open first end, an open second end, and a perimeter wall extending continuously from said open first end to said open second end;
   said plurality of pads including a front central pad coupled to said perimeter wall of said central section proximate said open first end of said central section;
   said plurality of pads including a back central pad coupled to said perimeter wall of said central section proximate said open second end of said central section;
   said plurality of sections including a front medial section slidably inserted into said open first end of said central section, said front medial section having an open first end, a second end, and a hollow interior extending from said open first end towards said second end, said second end of said front medial section being sized to engage an interior surface of said central section adjacent to said open first end of said central section whereby said front medial section is frictionally held in an extended position from said open first end of said central section; and
   said plurality of pads including a front pad, said front pad being coupled to and extending around said front medial section, said front pad being positioned adjacent to said open first end of said front medial section.

2. A vehicle side protector assembly for positioning to extend along a side of a vehicle, said assembly comprising:
   a collapsible rod assembly having a plurality of sections;
   a plurality of pads coupled to said rod assembly;
   a front attachment line coupled to and extending from said rod assembly;
   a back attachment line coupled to and extending from said rod assembly;
   a front attachment hook coupled to said front attachment line;
   a back attachment hook coupled to said back attachment line;
   said plurality of sections including a central section having an open first end, an open second end, and a perimeter wall extending continuously from said open first end to said open second end;
   said plurality of pads including a front central pad coupled to said perimeter wall of said central section proximate said open first end of said central section;
     said plurality of pads including a back central pad coupled to said perimeter wall of said central section proximate said open second end of said central section;
   said plurality of sections including a back medial section slidably inserted into said open second end of said central section, said back medial section having an open first end, a second end, and a hollow interior extending from said open first end towards said second end, said second end of said back medial section being sized to engage an interior surface of said central section adjacent to said open second end of said central section whereby said back medial section is frictionally held in an extended position from said open second end of said central section; and
   said plurality of pads including a back pad, said back pad being coupled to and extending around said back medial section, said back pad being positioned adjacent to said open first end of said back medial section.

3. The assembly of claim 1, further including said plurality of sections including a front end section, said front end section being slidably inserted into said open first end of said front medial section, said front end section having a first end and a second end, said second end of said front end section being sized to engage an interior surface of said front medial section adjacent to said open first end of said front medial section whereby said front end section is frictionally held in an extended position from said open first end of said front medial section.

4. The assembly of claim 2, further including said plurality of sections including a back end section, said back end section being slidably inserted into said open first end of said back medial section, said back end section having a first end and a second end, said second end of said back end section being sized to engage an interior surface of said back medial section adjacent to said open first end of said back medial section whereby said back end section is frictionally held in an extended position from said open first end of said back medial section.

5. The assembly of claim 1, further comprising:
a front collar coupled to and extending around said front medial section;
a front loop extending from said front collar; and
and said front attachment line having a proximal end relative to said front medial section coupled to said front loop.

6. The assembly of claim 5, wherein said front collar is positioned adjacent to a proximal end of said front pad relative to said central section.

7. The assembly of claim 2, further comprising:
a back collar coupled to and extending around said back medial section;
a back loop extending from said back collar; and
and said back attachment line having a proximal end relative to said back medial section coupled to said front loop.

8. The assembly of claim 7, wherein said back collar is positioned adjacent to a proximal end of said back pad relative to said central section.

9. A vehicle side protector assembly for positioning to extend along a side of a vehicle, said assembly comprising:
a collapsible rod assembly having a plurality of sections;
a plurality of pads coupled to said rod assembly;
a front attachment line coupled to and extending from said rod assembly;
a back attachment line coupled to and extending from said rod assembly;
a front attachment hook coupled to said front attachment line;
a back attachment hook coupled to said back attachment line; and
a secondary front attachment line coupled to and extending from said rod assembly.

10. The assembly of claim 9, further including a tertiary front attachment line coupled to and extending from said rod assembly.

11. A vehicle side protector assembly for positioning to extend along a side of a vehicle, said assembly comprising:
a collapsible rod assembly having a plurality of sections;
a plurality of pads coupled to said rod assembly;
a front attachment line coupled to and extending from said rod assembly;
a back attachment line coupled to and extending from said rod assembly;
a front attachment hook coupled to said front attachment line;
a back attachment hook coupled to said back attachment line; and
a secondary back attachment line coupled to and extending from said rod assembly.

12. The assembly of claim 11, further including a tertiary back attachment line coupled to and extending from said rod assembly.

13. A vehicle side protector assembly for positioning to extend along a side of a vehicle, said assembly comprising:
a collapsible rod assembly having a plurality of sections;
a plurality of pads coupled to said rod assembly;
a front attachment line coupled to and extending from said rod assembly;
a back attachment line coupled to and extending from said rod assembly;
a front attachment hook coupled to said front attachment line;
a back attachment hook coupled to said back attachment line; and
an attachment member having a base portion configured for coupling to the vehicle, said attachment member having a curved portion extending from said base portion of said attachment member whereby said back attachment hook is couplable to said attachment member.

14. The assembly of claim 9, further comprising:
a central section being one of said plurality of sections of said rod assembly, said central section having an open first end, an open second end, and a perimeter wall extending continuously from said open first end to said open second end;
a front central pad being one of said plurality of pads, said front central pad being coupled to said perimeter wall of said central section proximate said open first end of said central section;
a back central pad being one of said plurality of pads, said back central pad being coupled to said perimeter wall of said central section proximate said open second end of said central section;
a front medial section being one of said plurality of sections of said rod assembly, said front medial section being slidably inserted into said open first end of said central section, said front medial section having an open first end, a second end, and a hollow interior extending from said open first end towards said second end, said second end of said front medial section being sized to engage an interior surface of said central section adjacent to said open first end of said central section whereby said front medial section is frictionally held in an extended position from said open first end of said central section;
a front pad being one of said plurality of pads, said front pad being coupled to and extending around said front medial section, said front pad being positioned adjacent to said open first end of said front medial section;
a back medial section being one of said plurality of sections of said rod assembly, said back medial section being slidably inserted into said open second end of said central section, said back medial section having an open first end, a second end, and a hollow interior extending from said open first end towards said second end, said second end of said back medial section being sized to engage an interior surface of said central section adjacent to said open second end of said central section whereby said back medial section is frictionally held in an extended position from said open second end of said central section;

a back pad being one of said plurality of pads, said back pad being coupled to and extending around said back medial section, said back pad being positioned adjacent to said open first end of said back medial section;

a front end section being one of said plurality of sections of said rod assembly, said front end section being slidably inserted into said open first end of said front medial section, said front end section having a first end and a second end, said second end of said front end section being sized to engage an interior surface of said front medial section adjacent to said open first end of said front medial section whereby said front end section is frictionally held in an extended position from said open first end of said front medial section;

a back end section being one of said plurality of sections of said rod assembly, said back end section being slidably inserted into said open first end of said back medial section, said back end section having a first end and a second end, said second end of said back end section being sized to engage an interior surface of said back medial section adjacent to said open first end of said back medial section whereby said back end section is frictionally held in an extended position from said open first end of said back medial section;

a front collar coupled to and extending around said front medial section, said front collar being positioned adjacent to a proximal end of said front pad relative to said central section;

a front loop extending from said front collar;

and said front attachment line having a proximal end of said front attachment line relative to said front medial section being coupled to said front loop;

a back collar coupled to and extending around said back medial section, said back collar being positioned adjacent to a proximal end of said back pad relative to said central section;

a back loop extending from said back collar;

a proximal end of said back attachment line relative to said front medial section being coupled to said back loop;

a tertiary front attachment line coupled to and extending from said rod assembly;

a secondary back attachment line coupled to and extending from said rod assembly;

a tertiary back attachment line coupled to and extending from said rod assembly; and an attachment member having a base portion configured for coupling to the vehicle, said attachment member having a curved portion extending from said base portion of said attachment member whereby said back attachment hook is couplable to said attachment member.

\* \* \* \* \*